BAILEY & BURDICK.
Horse Rake.
No. 55,804.  Patented June 26, 1866.
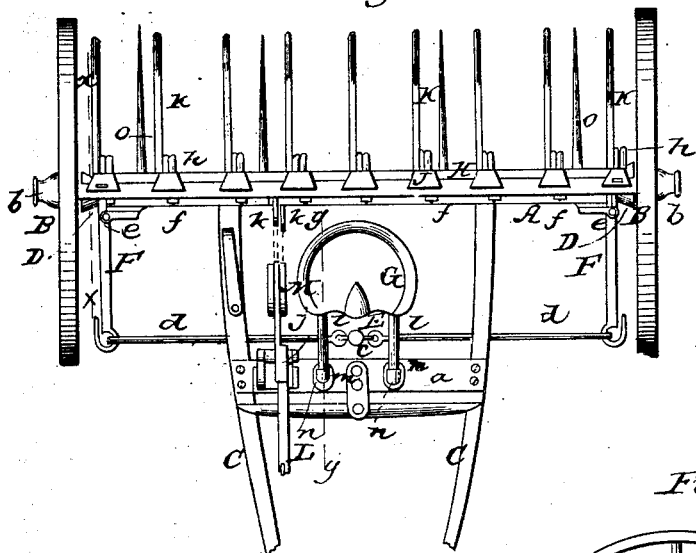
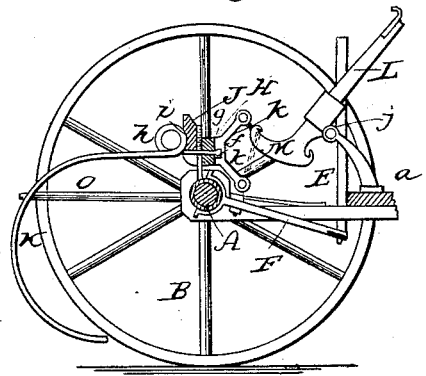
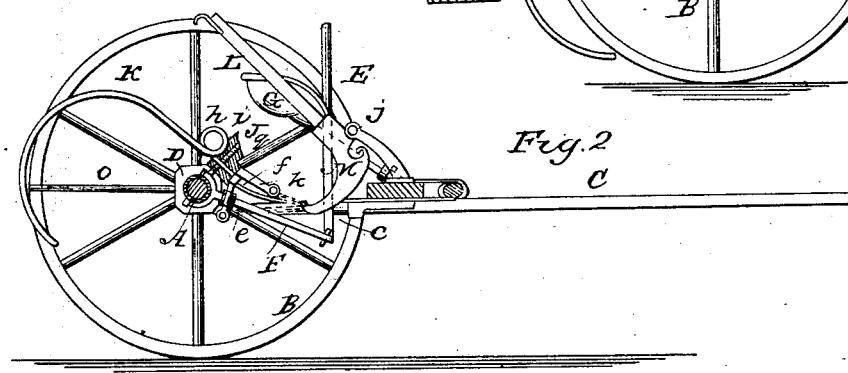

UNITED STATES PATENT OFFICE.

H. A. BAILEY AND A. R. BURDICK, OF RACINE, WISCONSIN.

IMPROVEMENT IN HORSE-RAKES.

Specification forming part of Letters Patent No. 55,804, dated June 26, 1866.

*To all whom it may concern:*

Be it known that we, H. A. BAILEY and A. R. BURDICK, of Racine, Racine county, State of Wisconsin, have invented a new and Improved Horse-Rake; and we do hereby declare that the following is a full, clear, and exact description thereof, which will enable others skilled in the art to make and use the same, reference being had to the accompanying drawings, forming part of this specification, in which—

Figure 1 is a plan or top view of our invention; Figs. 2 and 3, side sectional views of the same, taken in the same, line $x\ x$, Fig. 1; Fig. 4, a section of the driver's seat, taken in the line $y\ y$, Fig. 1.

Similar letters of reference indicate like parts.

This invention relates to a new and improved mode of attaching the teeth of the rake to the rake-head, and in an improved manner of operating the rake, and raising and lowering the same.

The object of the invention is to obtain a horse-rake which may be readily operated and be under the complete control of the driver, and one which will be strong and durable.

A represents an axle, the wheels B B of which are placed loosely upon it, and C C are thills attached to the axle, said thills being connected by a cross-bar, $a$. D D represent friction-clutches, which are fitted loosely on the axle A, so as to slide thereon. These clutches, when moved outward or toward the wheels B B, fit and bind over the inner parts of the hubs $b\ b$ of the wheels, so that they will turn with the latter, and said clutches are moved so as to engage with the hubs or be free therefrom by means of a lever, E, which has its fulcrum $c$ attached to the cross-bar $a$ of the thills, and is connected by rods $d\ d$ to the outer ends of levers F F, the fulcra $e$ of which are attached to the axle A, the inner ends of the levers F being forked and fitted over the clutches D D.

The lever E is within convenient reach of the driver on his seat G, so that the driver can at will engage the clutches D with the hubs of the wheels or disconnect the clutches from said hubs.

H represents the rake-head, which is connected to arms I I on the clutches D D. These arms I I pass through metal heads J on the ends of the rake-head H, and said heads J are secured to the rake-head by means of the rake-teeth K, the upper ends of which pass through the heads J, through any of a series of perforations in the arms I, and through the rake-head, the ends of the teeth having nuts $f$ on them. The heads have lips $g$ on them, which rest on the upper surface of the rake-head.

From the above description it will be seen that the rake-head may be raised or lowered by passing the upper end of the rake-teeth through different holes in the arms I I. (See Figs. 2 and 3.)

The upper parts of the rake-teeth are formed with one or more convolutions, $h$, which fit in grooves $i$ in the outer surfaces of the heads J.

All of the rake-teeth are secured to the rake-head in this manner, the arms I I, of course, passing through the outermost heads J at the ends of the rake-head. The rake-teeth by this arrangement are firmly secured in position, and may be readily attached and detached for repairs or for the substitution of new teeth when required.

L is a lever, which has its fulcrum $j$ attached to the cross-bar $a$ of the thills C C. This lever has an eccentric segment, M, on its lower end, and the ends of this segment are connected by cross-chains $j'\ j'$ to arms $k\ k$, secured to the front side of the rake-head. This lever L is within convenient reach of the driver on seat G, and by drawing the upper end of lever L backward the rake H will be elevated or raised, as shown in Fig. 2, and the rake kept down to its work by pressing forward said lever L.

In order to temporarily raise the rake that it may discharge its load, the driver actuates the lever E to engage the clutches D D with the hubs of the wheels, and thereby causes the rake to be elevated, the rake dropping down to its work by virtue of its own gravity as soon as the clutches are drawn back from the hubs of the wheels.

The driver's seat G rests upon two supports, $i\ i$, the lower ends of which pass through metal sockets $m\ m$, attached to the cross-bar $a$, and through holes in said cross-bar, pins $n$ passing through the sockets and supports. By this arrangement the seat may be adjusted higher or lower as desired. (See Fig. 4.)

The axle A has arms o projecting from its rear side to prevent the hay rising with the rake.

Having thus described our invention, what we claim as new, and desire to secure by Letters Patent, is—

1. The metal heads J, provided with lips g and grooves i, and retained on the rake-head by the upper ends of the rake-teeth K passing through them and the rake-head, substantially as and for the purpose herein set forth.

2. The attaching of the rake-head H to clutches D D, fitted loosely on the axle A, and operated by means of levers by the driver from his seat G, for the purpose of automatically raising the rake to discharge its load, substantially as shown and described.

H. A. BAILEY.
A. R. BURDICK.

Witnesses:
D. McDONALD,
L. H. MILLER.